United States Patent [19]

Mukouyama et al.

[11] Patent Number: 5,168,433
[45] Date of Patent: Dec. 1, 1992

[54] ELECTRIC DOUBLE-LAYER CAPACITOR

[75] Inventors: Hiroyuki Mukouyama; Michinobu Maesaka; Koichi Watanabe; Masanori Endo, all of Nagaokakyo, Japan

[73] Assignee: Murata Manufacturing Co., Ltd., Kyoto, Japan

[21] Appl. No.: 788,294

[22] Filed: Nov. 5, 1991

[30] Foreign Application Priority Data

Nov. 5, 1990 [JP] Japan .................. 2-300492

[51] Int. Cl.⁵ .............................. H01G 9/02
[52] U.S. Cl. .................................. 361/502
[58] Field of Search ............... 361/502; 252/62.2

[56] References Cited

U.S. PATENT DOCUMENTS 4,618,914 10/1986 Sato et al. ..................... 361/315
5,082,594 1/1992 Tsuzuki et al. ................. 361/502

Primary Examiner—Donald A. Griffin
Attorney, Agent, or Firm—Wenderoth, Lind & Ponack

[57] ABSTRACT

The present invention relates to capacitors utilizing an electric double layer formed in the interface of polarizable electrodes and an electrolyte. By using as the primary material of the polarizable electrodes an activated carbon in which the difference in titration value between the cases where sodium carbonate is used for neutralization titration of the activated carbon and where sodium hydrogencarbonate is used therefor is 0.195 meq/g or more to the weight of the activated carbon, the quantity of presence of the acidic functional group II (carboxyl group present as lactone) on the surface of the activated carbon is increased and, as a result, the affinity between the polarizable electrodes and the electrolyte is enhanced, thus providing electric double-layer capacitors low in variation with time and yet large in capacity.

1 Claim, 1 Drawing Sheet

ELECTRIC DOUBLE-LAYER CAPACITOR

BACKGROUND OF THE INVENTION

1. Field of the Invention

The present invention relates to electric double-layer capacitors which are low in capacity deterioration and long in service life.

2. Description of the Prior Art

FIG. 1 illustrates an electric double-layer capacitor device 1, where reference numeral 2 denotes a pair of polarizable electrodes 2 disposed in its center.

The polarizable electrodes 2 are made of solid carbonaceous compact primarily comprising an activated carbon, and is isolated by an electrically insulating separator 3.

Designated by numeral 4 are gaskets for both ends of the electric double-layer capacitor device 1, and by 5 are current collectors 5 thermally bonded to top and bottom of the gaskets 4.

In this arrangement, the polarizable electrodes 2 and separator 3 are accommodated inside the gaskets 4, in the state in which they are impregnated with an electrolyte such as, normally, a 50% by weight dilute sulfuric acid.

The above-described electric double-layer capacitor utilizes an electric double layer formed in the interface of the polarizable electrodes and the electrolyte Electrical characteristics and characteristic deterioration of the capacitor therefore depend to a great extent upon the affinity between the surface of the activated carbon, which is the primary material of the polarizable electrodes, and the electrolyte, or more specifically, upon the affinity between the surface functional groups present on the surface of the activated carbon and the electrolyte.

In more detail, on the surface of the activated carbon there exist some functional groups containing sulfur, hydrogen, chlorine, and nitrogen, as well as surface functional groups containing oxygen or functional groups containing oxygen, such as acidic functional groups, neutral functional groups, and basic functional groups.

The acidic functional groups are carboxyl group and phenylic hydroxyl group, the neutral functional groups are carbonyl group and quinone group, and the basic functional groups are unknown in detail of their structure.

The surface functional groups of the above-described activated carbon are shown in FIG. 2 by way of their models, where character I indicates carboxyl group, II does carboxyl group present as lactone, III does phenylic hydroxyl group, and IV does quinone group.

When an aqueous acidic electrolyte such as sulfuric acid is used as the electrolyte for the electric double-layer capacitor, any activated carbon which have on its surface more functional groups other than basic functional groups or functional groups containing oxygen would involve reactions between the electrolyte and the surface functional groups, causing the capacity for the weight of activated carbon to be lowered. In contrast, any activated carbon having a larger quantity of acidic functional groups (total quantity of all acidic groups, i.e. the sum of the quantities of carboxyl groups+carboxyl groups present as lactone+phenylic hydroxyl groups), if used as in the above case, will offer a higher level of capacity.

The above-described case is disclosed in Japanese Patent Laid-Open Publication No. 82514/1989.

The case disclosed therein is such that the more the total quantity of all acidic groups, the higher the capacity and besides the lower the capacity deterioration over long time periods.

However, even if the total quantity of acidic groups is large and the initial capacity is high, there have appeared some cases where capacity deterioration involved is considerably large.

In order to give larger capacities to electric double-layer capacitors, it is necessary to enhance the affinity between polarizable electrodes and electrolytes. (Without any high affinity, an activated carbon having a larger surface area, even if used as the primary material of the polarizable electrodes, would result in a poor utility efficiency of its surface area).

In the Japanese Patent Laid-Open Publication No. 82514/1989, there is disclosed a case where, as means for enhancing the affinity, oxidation treatment is performed and surface functional groups containing oxygen are brought into presence on the surface of an activated carbon. The publication describes that if an activated carbon has a large quantity of acidic functional groups (total quantity of all acidic groups, i.e. the sum of the quantities of carboxyl group I, carboxyl group present as lactone II, and phenylic hydroxyl group III, as shown in FIG. 2 mentioned above), it can offer a higher level of capacity.

On the contrary, it has been found that even if the capacity is made large by making large the total quantity of all acidic groups as above, it will involve a large extent of variation with time (capacity deterioration).

SUMMARY OF THE INVENTION

Accordingly, the object of the present invention is to provide electric double-layer capacitors which are low in variation with time and yet large in capacity, by specifying the quantity of presence of the functional group II out of the three acidic groups I to III in FIG. 2.

The present invention has been accomplished with a view to substantially solving the foregoing problems, and it provides an electric double-layer capacitor comprising polarizable electrodes utilizing an activated carbon in which the difference in titration value between the cases where sodium carbonate is used as the neutralization reagent for the activated carbon and where sodium hydrogencarbonate is used as the same is 0.195 meq/g or more to the weight of the activated carbon.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Now an embodiment of the present invention is described hereinbelow, referring to the accompanying drawings.

From examination of the relationship between the type of surface functional group and the corresponding capacity deterioration, results were obtained as shown in Table 1 given below.

TABLE 1

Surface Functional Group vs. Capacity Deterioration

| Activated carbon | Specific surface area (m²/g) | Surface functional group (meq/g) | | | Total quantity of all acidic groups: I + II + III [Total quantity of all acidic groups per surface area] (μeq/m²) | Capacity variation at deterioration accelerated test (%) | | | |
|---|---|---|---|---|---|---|---|---|---|
| | | I | II | III | | 85° C., 40 days (equivalent to three years' leaving at ordinary temperature) | Determination G: Over −50% | 85° C., 120 days (equivalent to 10 years' leaving at ordinary temperature) | Determination G: Over −50% |
| A | 1640 | 0.038 | 0.195 | 0.538 | 0.771 (0.47) | −14.4 | G | −48.0 | G |
| B | 1570 | 0.122 | 0.252 | 0.468 | 0.842 (0.54) | −11.3 | G | −37.1 | G |
| C | 2080 | 0.173 | 0.275 | 0.459 | 0.907 (0.44) | −10.0 | G | −33.2 | G |
| D | 1830 | 0.241 | 0.294 | 0.513 | 1.408 (0.57) | −4.9 | G | −16.7 | G |
| E | 1590 | 0.139 | 0.151 | 0.520 | 0.810 (0.51) | −50.8 | NG | −69.6 | NG |
| F | 1610 | 0.106 | 0.140 | 0.543 | 0.789 (0.49) | −52.3 | NG | −71.2 | NG |
| G | 1360 | 0.093 | 0.098 | 0.349 | 0.540 (0.40) | −58.1 | NG | −78.0 | NG |
| H | 1920 | 0.060 | 0.065 | 0.267 | 0.392 (0.20) | −64.1 | NG | −79.6 | NG |

Figure 1:
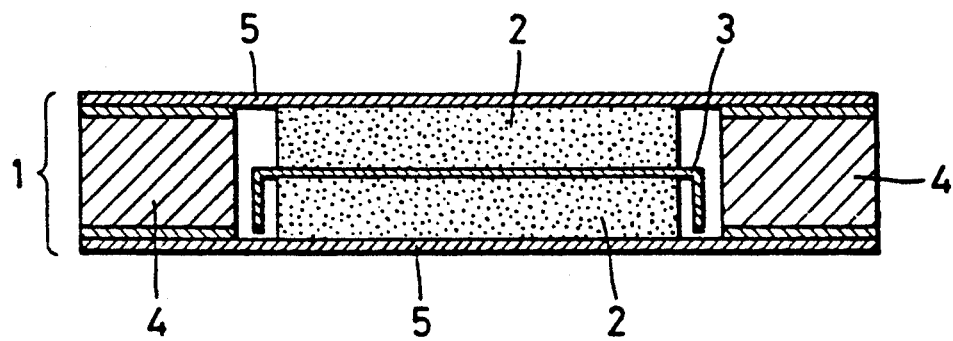
FIG. 1 is a longitudinal sectional view showing an example of the electric double-layer capacitor embodying the present invention.
Figure 2A:
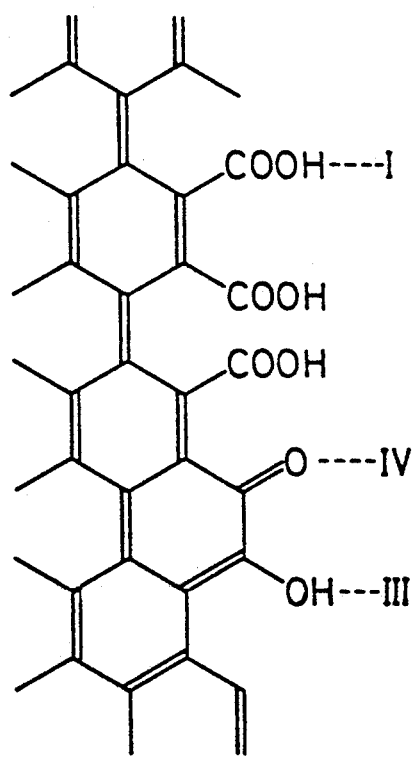
FIG. 2A and 2B are model views of surface functional groups of an activated carbon.
Figure 2B:
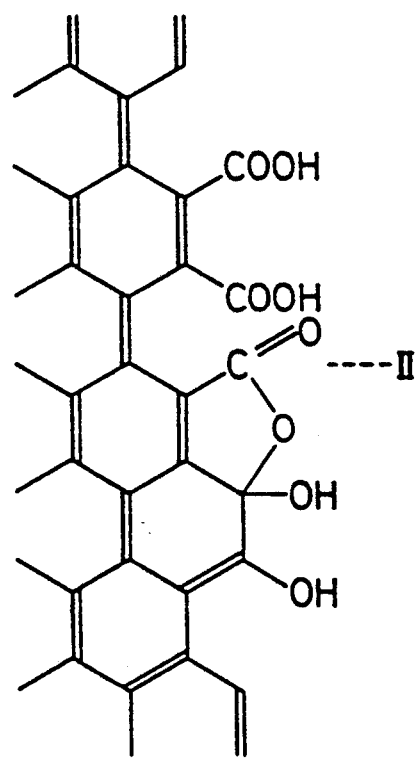

Assuming that the time is service life when the capacity deterioration exceeds 50%, the range of the quantity of the surface functional group II in FIG. 2 over 0.195 meq/g falls under the service life of 10 years or more; however, even if the total quantity of all acidic groups is large, a less quantity of II would result in the service life only less than three years.

This implies that the surface functional group II is particularly high in affinity with electrolytes out of the acidic functional groups I to III.

Accordingly, the present invention can provide an electric double-layer capacitor which is low in capacity deterioration and long in service life.

The above-described surface functional groups I to III can be known by the following method. (Method for measuring surface functional groups)

After shaking 1±0.001 g of a sufficiently dried activated carbon together with 50 ml of a neutralization reagent for 4 hours, the activated carbon is settled by a centrifuge. The resulting supernatant is sampled by 20 ml, and 50 ml of 0.05N HCl and 30 ml of water are added thereto. The solution is boiled to eliminate carbonic acid and back-titrated with 0.05N NaOH. Meanwhile, a blank test is also carried out and the quantity of the surface functional groups is determined by the following equation. As the indicator for titration, phenolphthalein is used.

$$C = (A - B) \times 0.05 \times f \times \frac{50}{20}$$

where, A is titration value of the activated carbon in ml, B is titration value of the blank test in ml, C is the quantity of surface functional groups in meq/g, and f is the factor of the 0.05N NaOH. Neutralization reagents used and the surface functional groups determined correspondingly thereto are as follows:

0.1N NaHCO₃ →I 0.1N Na₂CO₃ →I+II 0.05N NaOH→I+II+III

The electric double-layer capacitor of this embodiment of the present invention is of the same structure as in the drawings.

However, it differs in the activated carbon used in the polarizable electrodes 2 in the figure.

More specifically, this embodiment utilizes an activated carbon in which the difference in titration value between the cases where sodium carbonate is used as the neutralization reagent for the neutralization titration of the activated carbon and where sodium hydrogencarbonate is used as the same is 0.195 meq/g or more to the weight of the activated carbon.

As described hereinabove, the present invention utilizes, as the activated carbon used for the polarizable electrodes of the electric double-layer capacitor, an activated carbon in which the difference in titration value between the cases where sodium carbonate is used as the neutralization reagent for neutralization titration of the activated carbon and where sodium hydrogencarbonate is used as the same is 0.195 meq/g or more to the weight of the activated carbon. Thus, it can offer electric double-layer capacitors which are low in capacity deterioration by virtue of its high affinity with electrolytes and moreover long in service life.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An electric double-layer capacitor comprising polarizable electrodes utilizing an activated carbon, the activated carbon being characterized in that difference in titration value between cases where sodium carbonate is used as a neutralization reagent for neutralization titration of the activated carbon and where sodium hydrogencarbonate is used as the same is 0.195 meq/g or more to the weight of the activated carbon.

* * * * *